May 9, 1967 W. C. RUDD 3,319,040
HIGH FREQUENCY WELDING AND SHAPING OF METAL PARTS
Filed April 9, 1964 6 Sheets-Sheet 1
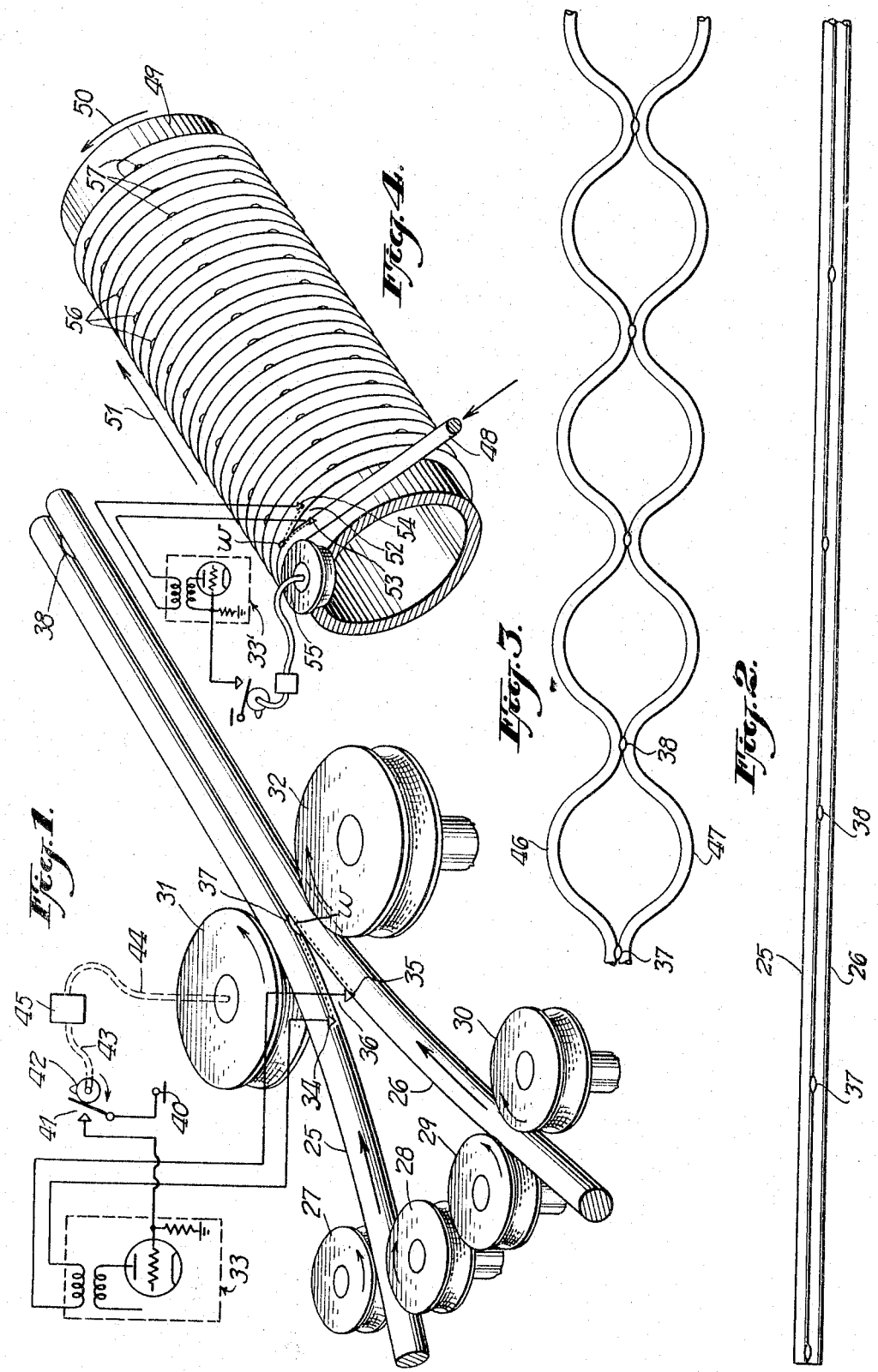

May 9, 1967 W. C. RUDD 3,319,040
HIGH FREQUENCY WELDING AND SHAPING OF METAL PARTS
Filed April 9, 1964 6 Sheets-Sheet 2
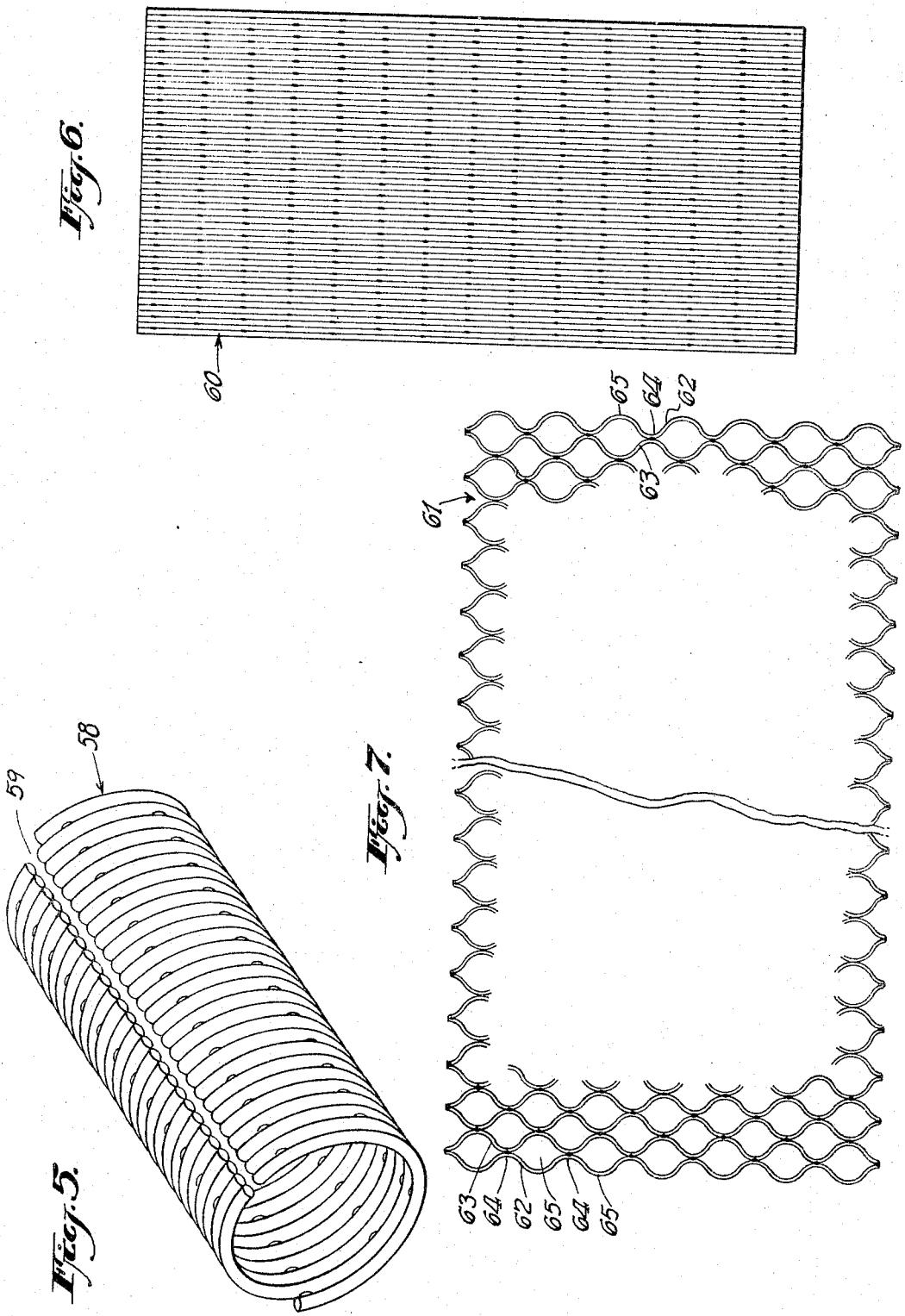

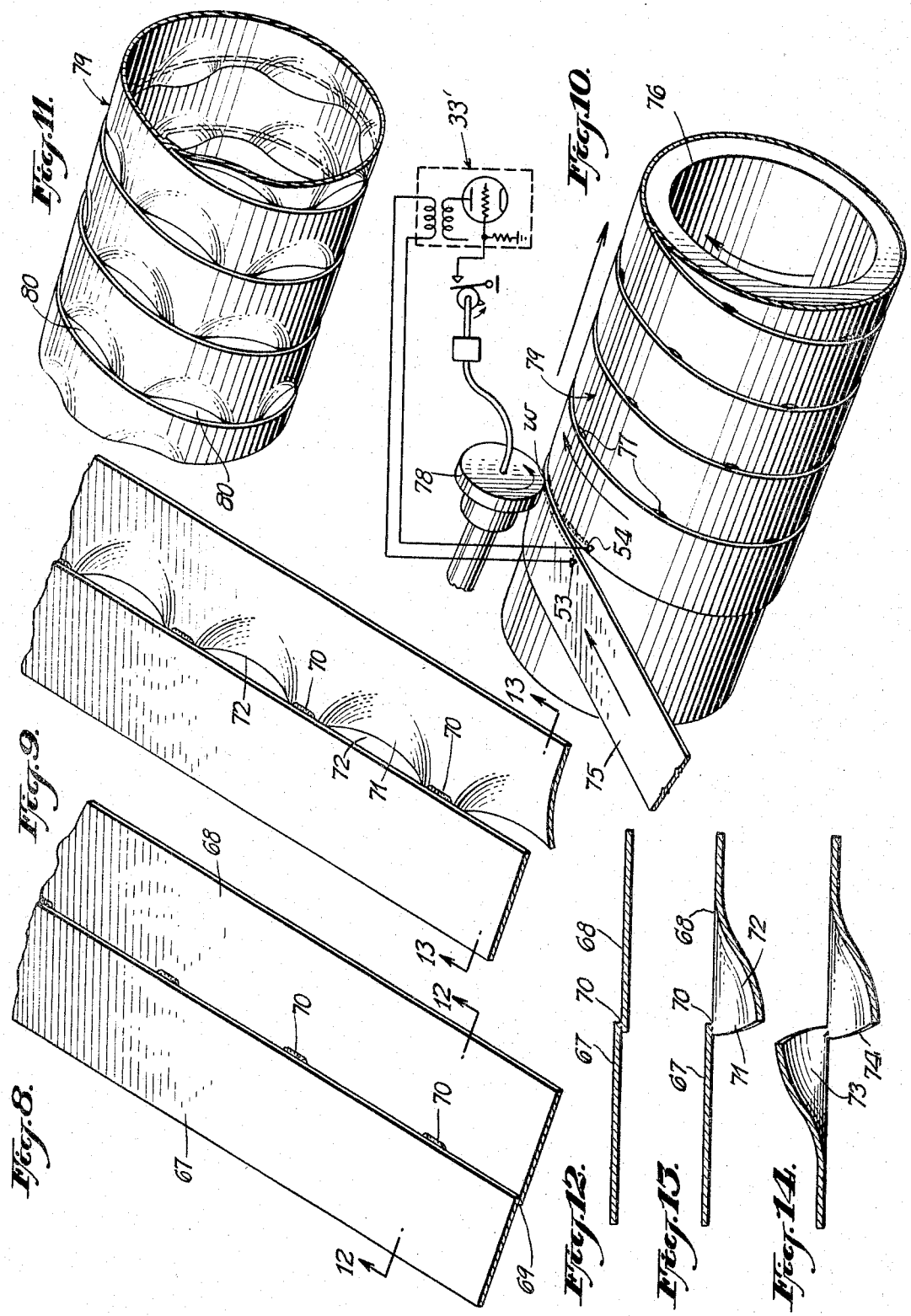

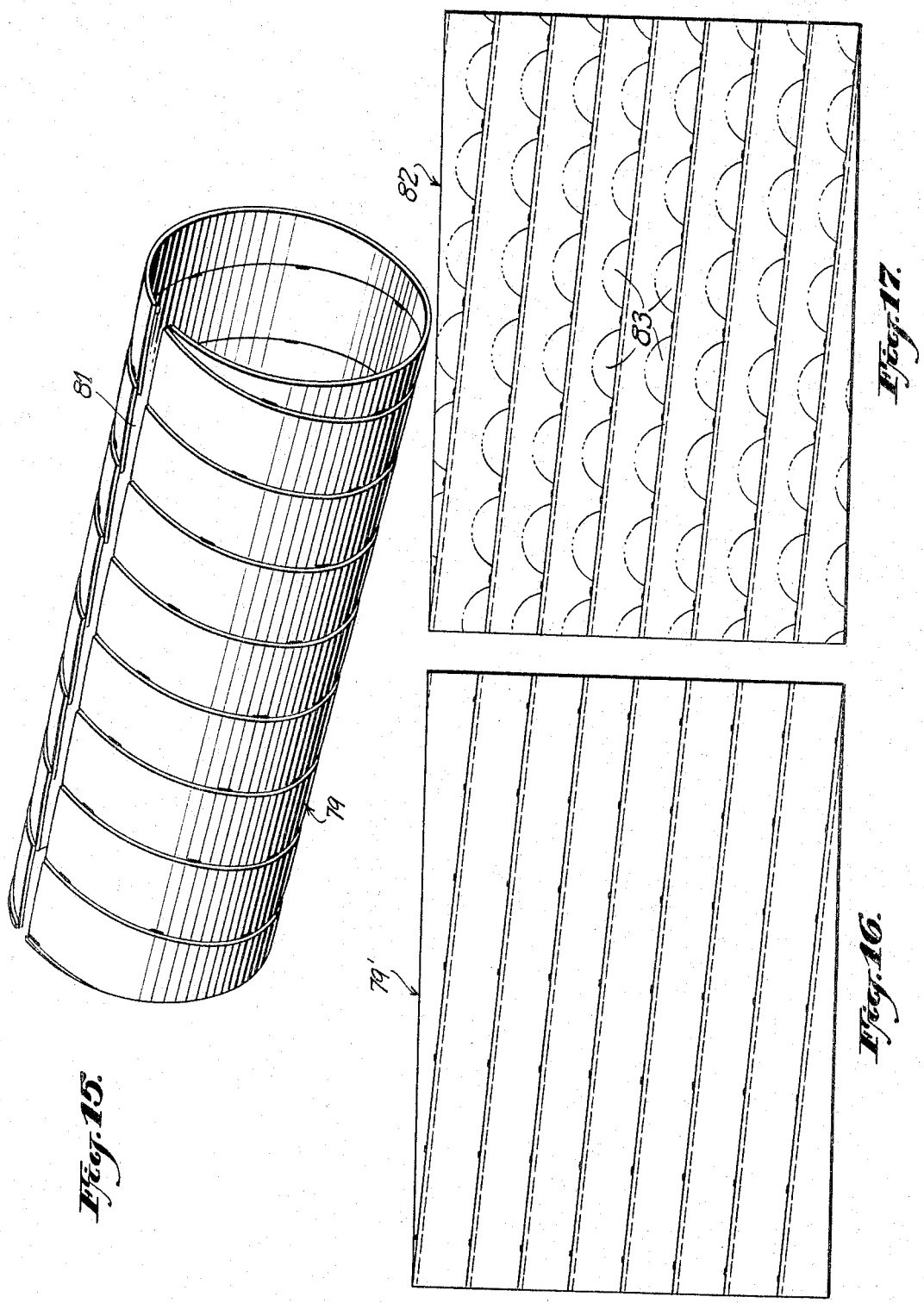

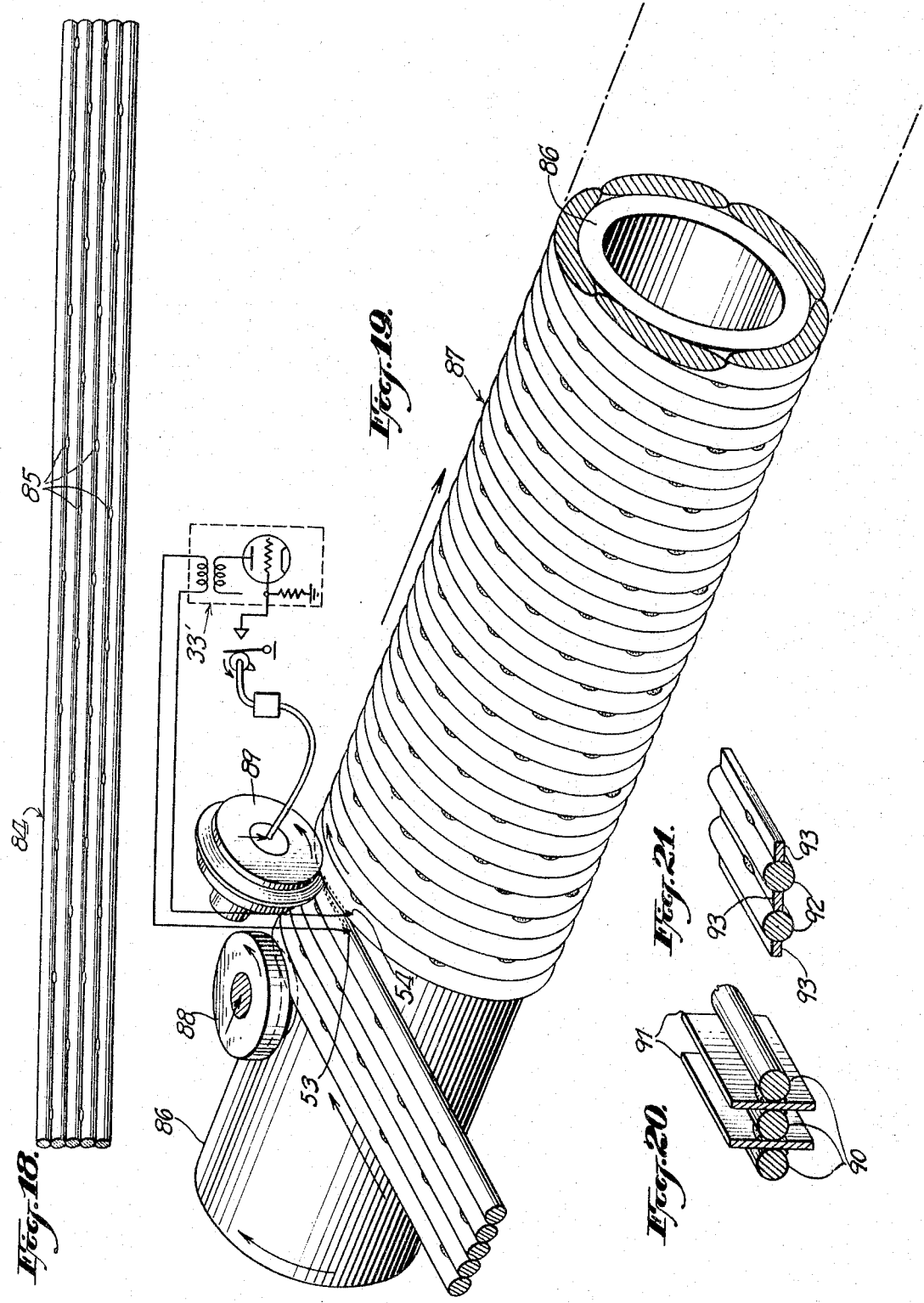

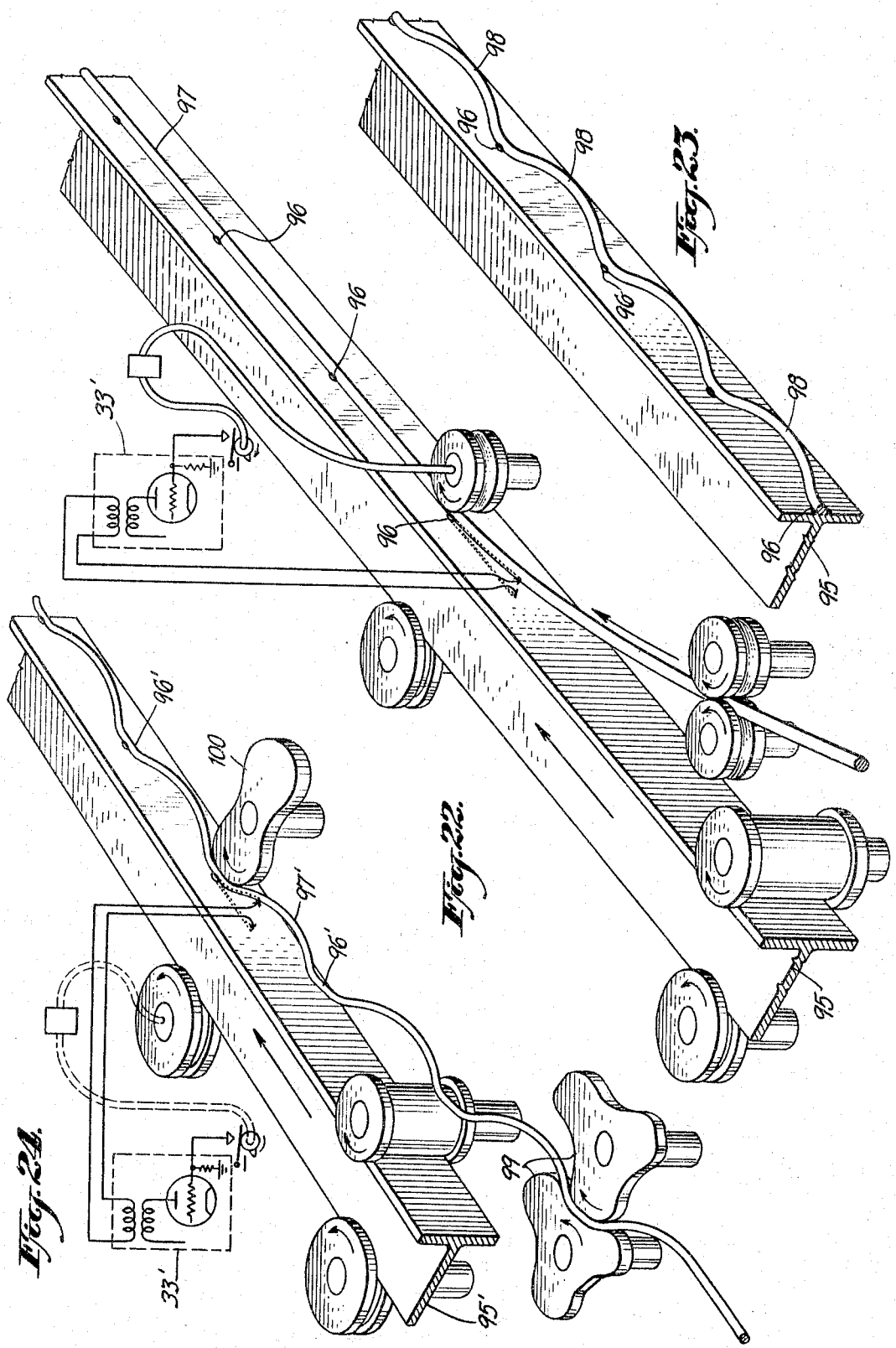

United States Patent Office 3,319,040
Patented May 9, 1967

3,319,040
HIGH FREQUENCY WELDING AND SHAPING OF METAL PARTS
Wallace C. Rudd, Larchmont, N.Y., assignor to American Machine & Foundry Company, New York, N.Y., a corporation of New Jersey
Filed Apr. 9, 1964, Ser. No. 358,447
14 Claims. (Cl. 219—102)

This invention relates to the welding of metal portions by the use of high frequency heating current and more particularly to the welding of such portions together by the use of pulses of such current, so that points or areas of welding will occur at predetermined spaced-apart intervals. The metal portions thus welded together at spaced intervals are, according to the invention, suitably reformed or shaped for forming a variety of useful objects.

A well known welding method now in use involves rapidly advancing longitudinally a pair of metal portions past a weld point where the portions are brought together under pressure to form a forged weld, there being applied to the metal portions respectively, prior to the weld point, contacts connected to the terminals of a source of high frequency current, whereby current flows from such contacts along the surfaces of the metal portions to and from the weld point as such surfaces approach each other with a V-shaped gap therebetween, the apex of the gap being at the weld point and substantially at the point where the surfaces of the approaching metal portions have first become heated up to welding temperature by reason of the high frequency current being closely concentrated on the very surfaces of the approaching members, and whereby a dependable uniform forged weld is secured at the weld point, without heating the metal to welding temperature or appreciably softening same, except on the very surfaces which come into engagement at the weld point. This method has proven to be a highly satisfactory way of uniformly and effectively forming a continuous forged weld between the rapidly advancing metal portions.

In accordance with the present invention, it has been found possible effectively to weld together at predetermined spaced intervals only, such rapidly longitudinally advancing metal portions by the use of such high frequency heating current, so controlled as to be applied during a succession of short spaced intervals so as to cause only short welding zones or areas to be formed between the two advancing metal portions, the zones, respectively, having accurately predetermined lengths and spacings and being welded with sufficient dependability and uniformity so that the parts of the metal portions between the weld points may be spread, stretched or spaced-apart and otherwise treated so as to make possible the manufacture of a variety of types of items hereinafter explained.

In practicing the method of the invention, the metal workpieces which are to be welded together at intervals are preferably advanced past the weld point very rapidly in the interests of efficiency, for example at speeds of many meters per minute or running up to hundreds of feet per minute, and yet each weld may only extend, for example, for a fraction of an inch. Thus with the general method of applying the high frequency heating current, as above described, it is not possible merely to apply same at the moment when the forward end of the desired weld arrives at the weld point and then to shut off the current when the trailing end of the desired weld passes the weld point, because before any welding will occur, it is necessary to bring the approaching gap edges up to welding temperature, by initiating the heating thereof before same actually reach the weld point. Also, so far as is known, no method of welding other than by the use of the general method of using high frequency heating current is adaptable or practically useful for forming such spaced-apart successions of welds, each of accurate predetermined length and with predetermined spacing and with the metal undistorted but securely welded at its surfaces. This is because, with other forms of heating to welding temperature, at least some time interval is required to bring the metal up to welding temperature and this interval is necessarily such that the metal, other than the approaching edge surfaces to be welded, becomes heated and more or less softened, and thus capable of being distorted and forming a weld which is uncontrolled in quality, position and length. However, in accordance with the present invention, by the use of high frequency current applied to the edges of the metal portions at a predetermined distance in advance of the weld point, depending upon the speed of the workpieces, the edge surfaces only, which are to be welded, may be brought to actual full welding temperature just at the moment when same reach the weld point where pressure is applied, and thus, if the high frequency current is applied to the workpieces for a time equal to the time required for the workpieces to pass from the contacts or point of application of the current to the weld point, plus the time required for the desired length of weld to pass the weld point, the current then being shut off, then the resulting weld will be formed with leading and trailing end portions at predetermined locations, and thus also the spacing between the welds of the series may be accurately predetermined. The accomplishment of this result accurately and uniformly is made possible preferably by the use of a vacuum tube oscillator as a source of the high frequency current and so controlling such oscillator as to block or shut off and to re-establish the current supply with accurate timing within a negligible fraction of a second, and with the high speed rate of travel of the workpieces controlling such timing.

The invention is applicable to the welding together of metal portions in the form of longitudinally-advancing wires, rods, tubes, strips, flanges or bands of metal, of either the same or dissimilar metals, and with either the same or different cross-sectional shapes. The high frequency current may be applied by contacts directly engaging the two workpieces respectively at a point shortly in advance of the weld point, or if preferred the high frequency current may sometimes be inductively applied, so long as it is so applied as to heat the surfaces which are to be longitudinally welded together up to welding temperature, starting at points at a predetermined distance (representing a predetermined time interval) in advance of the weld point so as to insure heating of the engaging surfaces at that point up to optimum welding temperature, without overheating, and substantially at the moment when pressure is applied at the weld point to form the forged weld.

According to other aspects of the invention, the metal portions may be welded together at a succession of intervals as the strip, rod, tube, or the like is being wound helically about an advancing mandrel. After the succession of welds has been thus formed between successive convolutions of the helically wound workpiece, same may be slit and then flattened out. And whether the succession of welds is formed between two or more of the longitudinally advancing workpieces, or between convolutions, the resulting product may be spread or stretched by means similar to that used in forming so-called expanded sheet metal and so that in accordance with the present invention, the final product may comprise an area of net-like construction, or, in the case of the helically wound workpiece, portions may be distorted to form in effect a perforated cylinder useful as a filter for example, and for other purposes hereinafter described.

Various further and more specific objects, features and advantages of the invention will appear from the description given below, taken in connection with the accompanying drawings, illustrating by way of example preferred forms of the invention.

In the drawings:

FIG. 1 is a somewhat schematic perspective view showing a pair of metal portions being welded together at spaced intervals in accordance with the invention;

FIG. 2 is a view showing a strip of the resulting welded product;

FIG. 3 is a view illustrating how the metal portions at regions between the weld points may be separated or stretched apart to provide a product such as here shown;

FIG. 4 is a view showing an alternative method of forming the succession of spaced-apart welded zones between the helical convolutions of a workpiece as same is rotated and axially advanced;

FIG. 5 is a view of the welded product obtained in accordance with the method of FIG. 4, but showing same after slitting longitudinally;

FIG. 6 illustrates how the product of FIG. 5 may be flattened out to form an area of side-by-side strips or rods with successions of welds between each adjacent pair;

FIG. 7 is a view illustrating how the product of FIG. 6 may be stretched and expanded to form a product which may be used, among other purposes, as netting, metal lathing or the like;

FIG. 8 is a view illustrating a pair of metal bands or strips which have been longitudinally welded together at predetermined spaced-apart intervals, the strip edges being overlapping;

FIG. 9 is a view of the product according to FIG. 8 after portions between the weld zones have been depressed to form specially shaped perforations or apertures between the weld points;

FIG. 10 illustrates the method in which a strip may be formed into helically overlapping convolutions while the leading and trailing edges of the convolutions are being welded together at spaced points;

FIG. 11 is a view illustrating a product made by the method of FIG. 10 and after the lapped helical edge portions between the weld zones have been depressed to form in effect specially shaped perforations in the product;

FIGS. 12 and 13 respectively are sectional views taken substantially along lines 12—12 and 13—13 of FIGS. 8 and 9;

FIG. 14 is a view similar to FIG. 13 but showing the resulting construction in case the overlapped edges at places between weld points are deflected apart in opposite direction;

FIG. 15 is a perspective view of the product as made in accordance with FIG. 10 but showing same after being longitudinally slit;

FIGS. 16 and 17 respectively are outside and inside developed views of the product of FIG. 15 after same has been flattened out, FIG. 17 showing the appearance of the flattened product after the intervals between welds have been stretched and depressed in accordance with FIG. 13;

FIG. 18 is a view showing a group of rods, wires or the like, welded together side-by-side at spaced intervals;

FIG. 19 is a view showing a method by which a product as of FIG. 18 may be helically wound so that convolutions of groups of the metal members become welded at intervals to form a cylindrical product which later may be longitudinally slit and flattened out as in the case of FIGS. 5 and 6;

FIGS. 20 and 21 are views showing short lengths of pluralities of metal members of various different cross-sectional shapes which have been welded together at spaced intervals and which as a group, if desired, may be welded into a helical formation as per a method similar to that of FIG. 19;

FIG. 22 illustrates a method in accordance with another embodiment of the invention, wherein a concrete reinforcing rod is welded at spaced intervals to a beam;

FIG. 23 illustrates the manner in which portions of the reinforcing rod between the welds may be stretched outwardly of the beam ready for use; and FIG. 24 illustrates an alternative for the method of FIG. 22 and in which the reinforcing rod is given a sinuous shape before being welded to the beam at spaced intervals.

Referring now to FIG. 1 in further detail, a pair of workpieces 25 and 26 are here shown as being rapidly advanced longitudinally past a weld point w. The workpieces or portions are suitably guided as by rollers 27, 28 and 29, 30, and same are forced together under pressure at the weld point by pressure rollers 31 and 32. Various of these rollers may be power driven or alternatively other means may be provided for either pushing or pulling the workpieces to cause them to advance rapidly and uniformly.

As the source of high frequency heating current, a high frequency vacuum tube oscillator is diagrammatically indicated at 33, having its output terminals connected to contacts 34 and 35, which respectively engage the workpieces at a short distance in advance of the weld point w. These contacts, as per common practice, should be fluid-cooled and so mounted as slidably, or rotationally and resiliently, to engage the workpieces. The frequency of the current supplied by the oscillator should preferably be at least about 50,000 cycles per second or preferably higher, for example in the range of 300,000 to 400,000 cycles per second. Normally such current as applied by the contacts 34, 35, which are located at each side of the V-shaped gap 36 between the approaching workpieces, will flow, as indicated by the dotted lines, along on the closest facing surface portions of the workpieces to and from the weld point w, the current being closely concentrated on such surfaces by reason of mutual inductance and so that, by the time any portion of such surfaces arrives at the weld point, same will be heated up to welding temperature, but only on the surface areas, preferably with no softening of the metal to any substantial depth beneath the surfaces.

As here shown, the workpieces are being welded together at spaced-apart short areas, such as indicated at 37, 38. It is generally important that the lengths of these welds, as well as the spacing therebetween, be carefully controlled and predetermined, otherwise when the welded product is later stretched or reformed at portions thereof as hereinafter described, the resulting structures will tend to be irregular, rather than conforming to an accurately predetermined pattern, as will usually be desired. Thus, in order to form these spaced-apart welds uniformly and with uniform spacing, it is necessary to apply the high frequency current and to interrupt same at accurately predetermined intervals. While this may be accomplished in various ways, preferably, in accordance with the invention, the current from the oscillator is caused to be "blocked" or shut off for the desired intervals of non-welding by applying to the grid of the oscillator a negative or blocking potential from a source indicated at 40, connected to the grid through a switch 41, which may be actuated by a cam 42. This cam may be actuated by any suitable mechanical connections, as at 43, 44 (here schematically shown), to the shaft for one of the rollers, for example the pressure roller 31. In this mechanical connecting means, a suitable gearbox 45 may be provided, with gearing designed to so actuate the cam that it will close the switch 41 at the desired predetermined intervals and maintain same in closed condition for the time required following termination of one weld, until it becomes necessary to reapply the current for forming the next weld. If it is unimportant that the spacing and lengths of the welds be closely correlated to the speed of movement of the workpieces, then of course the pulses from the oscillator, or whatever other high frequency source is used, may be controlled by any other known form of timing means independently of the movement of the workpieces particularly if such movement is uniform.

In determining the time during which the oscillator is active to apply the high frequency current, the following considerations should be noted. Generally, as above stated, the workpieces will be travelling through the apparatus at a relatively high speed and, before a point at which a weld is to start arrives at the weld point, the approaching surfaces at the gap 36 will have to be preheated so that, by the time they arrive at the point of beginning of the weld, they will have preferably just reached full welding temperature. This necessitates that the current be applied to the approaching gap surfaces prior to their reaching the weld point for an interval corresponding to the distances between the contacts 34 and 35 and the beginning of the weld, and the current will continue to be applied until the short weld is terminated, whereupon the current is interrupted so that no further points will be heated to welding temperature. For example, if the workpieces are travelling at a typical speed of 120 feet per minute, and if, as in a typical case, the contacts are located about 1½″ in advance of the weld point, then the current will be applied for a period of about 0.0625 second while points on the workpieces are travelling from the contacts to the weld point, and in addition, assuming for example that the weld is to be one-quarter inch long, the current should continue to be applied for a further period of about 0.01 second, whereupon the oscillator is blocked and the current discontinued until the heating cycle for the next succeeding weld is to start. Of course, if the workpieces are caused to travel at greater or lesser speeds than in this example, or if the lengths of the welds are to differ, the gearing at 45 should be adjusted accordingly, but in any event, if, as generally preferred, the welds are to be accurately located and of accurate uniform lengths, it will be apparent that the control of the duration of the pulse of heating current must be quite precise. Also, it will be apparent that the duration of the heating pulses must be considerably longer than the time interval during which the actual weld zone requires to pass the weld point, this being because it is necessary to bring the surfaces to be welded up to welding temperature in advance of the weld point, even though the required interval of preheating is quite short, in view of the rapid movement of the workpieces. The interval of preheating, of course, will depend upon the speed of the workpieces and the distance at which the contacts have to be placed in advance of the weld point in order to assure that the heated surfaces are neither overheated upon coming into welding contact, or not heated enough to become welded. If the surfaces are overheated, this will tend to soften the metal to some depth beneath the surfaces and thus detract from the quality or uniformity of the welds. But by controlling the high frequency current in the above-described manner, the starting of the welding interval may be very finely controlled, and also the termination of the heating may be made abruptly at the predetermined interval when the trailing end of the weld reaches the weld point. With the current then shut off, no further parts of the approaching surfaces will quite reach welding temperature.

It is not essential that the current be completely shut off, however, at the termination of a weld, inasmuch as, if for any reason it may be desired, a small amount of the current may continue to be applied, while portions of the workpieces between the welds are being advanced, so long as the current at such times is insufficient to heat to welding temperature. Thus in the case of the use of blocking means for an oscillator tube, it may in some cases be unnecessary that the current be completely blocked at intervals between welds so long as the current is limited to a value substantially below that required for heating the surfaces to welding temperature. In such cases the duration of the period of preheating just prior to the start of a weld may be shortened, if for any reason such a practice should be preferred.

A strip of the welded product is indicated in FIG. 2, and after same has thus been formed, the portions of the members 25, 26 between the welds may be stretched or bent and thereby separated, for example as shown at 46 and 47 in FIG. 3. The resulting product as shown, or with other members similarly formed and welded thereto with spaced-apart welds, is adapted for various uses, some of which are hereinafter described.

With the embodiment of the invention as shown in FIG. 4, a single workpiece 48 in the form of a rod, strip, wire, tube or other cross-sectional shape, is wound with helical convolutions about a mandrel means, such as at 49, which is rotated in the direction indicated by the arrow 50 by suitable power means while it is being advanced longitudinally in the direction of the arrow 51. Meanwhile, as the member 48 tangentially approaches the mandrel, it will form a V-shaped gap as at 52 with respect to each previous convolution, and contacts as at 53, 54 may be applied at opposite sides of this gap shortly in advance of the weld point w, so that current flows from the contacts to and from the weld point along the surface portions which most closely face each other, thereby heating the surface to the welding temperature upon reaching the weld point. The member 48 may, of course, be guided and fed onto the mandrel by any suitable rollers or other means (not shown) and at the weld point a suitable pressure roller as at 55 resiliently applied, if desired, may be used to press the convolutions into contact at the weld point to form a forged weld therebetween. The source of high frequency current pulses, schematically indicated at 33′ may be like or similar to that shown at 33 in connection with FIG. 1 and the pulses may be controlled in a similar manner either by suitable mechanical connections and gearing driven from the rotating mandrel or from the shaft of pressure roller 55. If desired, the mandrel 49 may be formed of insulating material or with a surface of insulating material, so as not to interfere with the high frequency path to and from the weld point, but usually this will not be necessary inasmuch as the paths of lowest impedance, at which the current will be closely concentrated, will be along the approaching surfaces of the gap 52.

In order that the product as welded in accordance with FIG. 4 may be put to the various uses such as hereinafter explained, it is important that the timing of the heating current pulses be properly correlated with the rotational speed and dimensions of the mandrel, so that the welds will be at accurately located positions about the mandrel. That is, in the example shown, the timing of the making of alternate welds, such as indicated at 56, will be such that these welds will occur in alignment, whereas the timing of the intervening welds, such as indicated at 57, will be such that same will also be in alignment along a line parallel to, but spaced a predetermined distance from the line of the welds 56.

As shown in FIG. 5, the numerous convolutions as pulse-welded according to FIG. 4, will form a generally cylindrical product, as indicated at 58, which either before or above removal from the mandrel, may be longitudinally slit as at 59 by the use of any suitable metal cutting means, whereupon the cylindrical formation may be flattened out to form an area 60 as in FIG. 6, made up of numerous side-by-side elements, each welded to the adjacent one at spaced predetermined locations. Then the product shown in FIG. 6, may be subjected to suitable stretching forces applied to the portions of each element located between the welds, so as to form a product in the nature of netting or such as suitable for lathing purposes, or the like, as shown in FIG. 7. This stretching and expanding operation may be carried out by the use of equipment such as generally well known in the art of forming expanded sheet metal products. The resulting formation, it will be noted, is comprised of a series of strips or the like, as at 62, 63, welded together at spaced points as at 64, with intervening loops or apertures as at 65. In order that these apertures will be uniform as to size and shape, it will be apparent that the proper location of the spaced-apart welds should be accurately predetermined as above explained in connection with FIG. 4.

FIG. 8 illustrates a product similar to that shown in FIG. 2, except that here the welded members 67, 68 comprise strips, the edges of which are overlapped, as indicated at 69, and secured together at predetermined intervals by spaced-apart welds, each of predetermined length, as indicated at 70. This product may be made by methods similar to that described in connection with FIG. 1, except that of course the rollers used for advancing and pressing the material together at the weld point, should be suitably shaped to accommodate these strips, and, if desired, at the weld point, pressure rollers may be so located above and beneath the strips, as to mash the line of weld together under pressure sufficient to reduce the overlapped thickness partially or wholly to the thickness of a single strip. After the product, as shown in FIG. 8, has been formed, the unwelded overlapped portions on one of the strips may be depressed, as indicated at 71, with respect to the opposed edge, so as to form apertures, as indicated at 72, for any desired purpose, or, as indicated in FIG. 14, the overlapped edges between the welds respectively may be stretched out in opposite directions, as indicated at 73 and 74.

If desired, a strip of metal as at 75 may be wound in convolutions about a mandrel as indicated at 76 in FIG. 10, while edges of the convolutions are overlapped at a weld point w to form welds at spaced intervals, as indicated at 77. Here a pressure roller 78 may be applied at or adjacent the weld point, for pressing the overlapped edges together to the desired extent to form forged welds. The manner in which the pulses of high frequency current are applied from the source 33' to the contacts 53 and 54, will be apparent from the above descriptions of other embodiments of the invention.

The cylindrical product 79 as made according to the method of FIG. 10, may, after removal from the mandrel 76, be deformed at locations between the welds, such as indicated at 80, thus to provide in effect a cylinder formed with apertures of predetermined sizes at predetermined locations and the product being adaptable for use for example as a filter, or for other purposes.

If desired, however, the cylindrical product 79, as made by the method of FIG. 10, may be longitudinally slit as indicated at 81 in FIG. 15, and thereafter spread out to a flattened condition to form an area such as shown at 79' in FIG. 16 and comprising a plurality of the side-by-side strips, each welded to the next at spaced points. Furthermore, if desired, after thus being flattened out, this area may be deformed to provide an area such as shown at 82 in FIG. 17, wherein at zones between the welds, portions of metal have been depressed, as indicated at 83, to provide predetermined rows of apertures of predetermined size and shape.

FIG. 18 shows a further development of the invention, wherein a product, as indicated at 84, has been formed, like that of FIG. 2, but constituted of several elements each secured at predetermined spaced points to the next by welds, as at 85. Then the product, as shown in FIG. 18, if desired, may be wound about a mandrel as at 86 (as shown in FIG. 19) and succeeding convolutions thereof may be welded at spaced points to form a cylindrical product, as at 87, similar to that of FIG. 4, except that each convolution embodies a plurality of strands, strips or rods. The pulses of high frequency current may be applied from a source 33' to the contacts 53, 54 as shown, in the same manner as above explained in connection with other embodiments, and the position of the convolutions at the weld point may be controlled by pressure rollers such as indicated at 88 and 89, suitably shaped and positioned to correspond to the work. As further shown in FIG. 20, an assembly of elements such as rods 90 and strips 91, may be prewelded together at spaced points and then utilized as per the method of FIG. 19 in a manner similar to that by which the product 84 of FIG. 18 is handled. In this way a cylindrical welded structure may be formed, for example such as to have spaced helical fins on edge. FIG. 21 shows another example of such an assembly of elements welded together at spaced points. Here the elements comprise rods as at 92, pulse welded at their sides to intervening narrow strips, for example as at 93.

As shown in FIG. 22, a rapidly advancing metal beam, for example as indicated at 95, may have welded thereto at spaced points, such as indicated at 96, a strip or rod 97, such as may be used for reinforcing purposes when the beam is to be covered with concrete. The method of operation of the arrangement of FIG. 22 will be readily apparent from the above explanations of the other embodiments. After the rod 97 has been thus welded at spaced points, portions thereof, as indicated at 98, may be stretched out away from the beam into positions to be well surrounded by concrete, when in use.

A somewhat similar embodiment as shown in FIG. 24, wherein a beam 95' is being rapidly advanced while a reinforcing rod or strip as at 97' of generally sinuous shape is being welded thereto at spaced points, the rod 97' being suitably preshaped to generally sinuous form, but preferably with short straight lengths 96' at the regions where the welds occur, as by the use of members 99, as the rod is being fed to the weld point where a rotated pressure device, such as indicated at 100, is used to press desired portions of the rod into welded engagement with the beam.

Although certain particular embodiments of the invention are herein disclosed for purposes of explanation, further modifications thereof, after study of this specification, will be apparent to those skilled in the art to which the invention pertains.

Reference should be had to the appended claims in determining the scope of the invention.

What is claimed and desired to be secured by Letters Patent is:

1. Method for forming a succession of welds of a predetermined short length and at predetermined spaced positions along between opposed surfaces of two metal portions, which method comprises: advancing said portions at a rate of many meters per minute with their said surfaces passing along the line of the desired welds and past a weld point, the advancing portions forming therebetween a V gap with its apex at said point; firmly retaining said portions with their surfaces in contact under pressure as they pass said point; causing short pulses of current which has a frequency of about 50,000 cycles per second or higher to flow, during each of a succession of predetermined intervals, along on said surfaces to and from said weld point from opposed points located at said surfaces at a substantial distance in advance of the weld point; and correlating
 (i) said distance,
 (ii) the rate of advance of the metal portions together with the duration and spacing of said intervals, and
 (iii) the strength of said current, to cause substantially the surfaces only of the metal being welded to be heated up to full welding temperature, while passing through said distance during the initial portion of each pulse, whereby in passing the weld point said surfaces then are subjected to forge welding during the remainder of such pulse.

2. Method in accordance with claim 1 and in which said high frequency current is supplied from an oscillatory source and in which method each of said pulses is terminated by blocking said source at predetermined times in accordance with the advancement of said metal portions and for a predetermined time until starting of the next pulse for forming the next of the succession of welds.

3. Method for forming a product comprised of a succession of convolutions of an elongated metal member with the adjacent convolutions joined together by welds, each of predetermined length at predetermined spaced positions, such method comprising: advancing said member while winding same about a relatively rotating and axially advancing supporting means, thereby to form the succession of convolutions of the member and while forming welds between adjacent convolutions in accordance with the method set forth in claim 1, the weld point being at a fixed point between two convolutions and said metal portions respectively being comprised of portions of said elongated metal member on two of the convolutions which are being advanced past said weld point.

4. Method in accordance with the foregoing claim 3 and in which the timing of said pulses is so controlled in accordance with the rotation of said supporting means that the successions of welds between alternate pairs of adjacent convolutions will occur in alignment and the successions of welds between intervening pairs of adjacent convolutions will occur in alignment, but with the latter welds in an alignment spaced a predetermined distance angularly about the convolutions with respect to said first-mentioned alignment.

5. Method in accordance with the foregoing claim 3 and in which the assembly of convolutions as welded together at spaced positions is thereafter longitudinally slit and spread open to form an area of side-by-side lengths of metal portions each welded to the next by spaced-apart welds.

6. Method in accordance with the foregoing claim 5 and in which the portions of said lengths at locations between the welds are spread apart thereby to form a net-like area.

7. Method in accordance with the foregoing claim 3 and in which the elongated metal member comprises a band-like strip and the trailing edge of each convolution of which is overlapped and pressed into welded engagement at the spaced positions with the leading edge of the next succeeding convolution, the overlapping edges of the band at locations between the welds being thereafter spread apart to form apertures between the trailing and leading edges.

8. Method in accordance with the foregoing claim 7 and in which the assembly of convolutions as welded together at spaced positions is thereafter longitudinally split and spread open to form an area of side-by-side lengths of the strip, each welded to the next by spaced-apart welds.

9. Method in accordance with the foregoing claim 8 and in which portions of said strips at locations in the area between welds are spread apart, thereby to form an area of sheet metal with numerous apertures at predetermined locations formed therein.

10. Method in which several metal portions are, according to the method of claim 1, welded together side-by-side with a succession of welds of predetermined length and at predetermined spaced positions along between opposed surfaces at each pair of said metal portions.

11. Method in accordance with claim 10 and in which forces are thereafter applied to stretch apart the side-by-side portions at locations between welds to form a net-like area.

12. Method in accordance with the foregoing claim 10 and in which the several metal portions as welded together side-by-side at spaced positions are helically wound as a group to form a succession of convolutions each constituted of said several portions welded together side-by-side, and meanwhile welding together the trailing edge of each such convolution to the advancing edge of the next succeeding convolution at predetermined spaced-apart locations.

13. Method in accordance with the foregoing claim 10 and in which alternate ones of said several metal portions respectively comprise strips and rods.

14. Method in accordance with the foregoing claim 1 and in which one of said metal portions comprises a structural beam, and the other of which comprises a rod or strip for concrete reinforcing purposes and the like, which becomes welded to the beam at predetermined spaced positions.

References Cited by the Examiner

UNITED STATES PATENTS

| | | | |
|---|---|---|---|
| 1,942,304 | 1/1934 | Mylting | 219—76 X |
| 2,004,409 | 6/1935 | Hopkins | 219—56 X |
| 2,240,210 | 4/1941 | Dreyer | 219—62 X |
| 2,313,329 | 3/1943 | Evert | 219—62 |
| 2,821,619 | 1/1958 | Rudd | 219—107 |
| 2,873,353 | 2/1959 | Rudd | 219—62 |
| 3,073,944 | 1/1963 | Yuter | 219—62 |

RICHARD M. WOOD, *Primary Examiner.*

B. A. STEIN, *Assistant Examiner.*